(12) United States Patent
Murthy et al.

(10) Patent No.: US 11,334,338 B2
(45) Date of Patent: May 17, 2022

(54) OPERATING SYSTEM UPDATE MANAGEMENT

(71) Applicant: VMWARE, INC., Palo Alto, CA (US)

(72) Inventors: Varun Murthy, Atlanta, GA (US); Jason Roszak, Atlanta, GA (US); Saransh Bhatnagar, Bangalore (IN); Kalyan Regula, Atlanta, GA (US); Shravan Shantharam, Atlanta, GA (US); Blake Watts, Atlanta, GA (US); Scott Kelley, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 54 days.

(21) Appl. No.: 16/403,649

(22) Filed: May 6, 2019

(65) Prior Publication Data
US 2020/0241868 A1    Jul. 30, 2020

(30) Foreign Application Priority Data

Jan. 25, 2019    (IN) .............................. 201941003120

(51) Int. Cl.
| G06F 15/173 | (2006.01) |
| G06F 8/65 | (2018.01) |
| G06F 11/30 | (2006.01) |
| G06F 11/34 | (2006.01) |

(52) U.S. Cl.
CPC .............. G06F 8/65 (2013.01); G06F 11/302 (2013.01); G06F 11/3409 (2013.01)

(58) Field of Classification Search
CPC ....... G06F 8/65; G06F 11/302; G06F 11/3409
See application file for complete search history.

(56) References Cited

U.S. PATENT DOCUMENTS

| 9,311,066 | B1* | 4/2016 | Garman | .................... G06F 8/60 |
| 2011/0302576 | A1* | 12/2011 | Shen | ......................... G06F 8/61 |
| | | | | 717/177 |
| 2012/0272103 | A1* | 10/2012 | Calinoiu | ............. G06F 11/3688 |
| | | | | 714/47.1 |
| 2012/0304165 | A1* | 11/2012 | Bechtel | ..................... G06F 8/60 |
| | | | | 717/174 |
| 2016/0162275 | A1* | 6/2016 | Morley | ..................... G06F 8/65 |
| | | | | 717/170 |
| 2017/0141968 | A1* | 5/2017 | Lloyd | ................. H04L 41/0886 |

* cited by examiner

*Primary Examiner* — Lewis A Bullock, Jr.
*Assistant Examiner* — Mohammad H Kabir
(74) *Attorney, Agent, or Firm* — Thomas Horstemeyer, LLP (57) ABSTRACT

Various examples are described for operating system update management. In some examples, an OS update schedule is generated. The OS update schedule specifies an OS update for a plurality of client devices. A command to deploy the OS update is transmitted to a subset of the client devices. Update behavior data is received from the client devices that have applied the OS update. An analysis of the update behavior data correlates an update incompatibility with the OS update. The OS update is prevented from being deployed to additional client devices specified in the OS update schedule.

20 Claims, 5 Drawing Sheets

OPERATING SYSTEM UPDATE MANAGEMENT

RELATED APPLICATIONS

Benefit is claimed under 35 U.S.C. 119(a)-(d) to Foreign Application Serial No. 201941003120 filed in India entitled "OPERATING SYSTEM UPDATE MANAGEMENT", on Jan. 25, 2019, by VMWARE, INC., which is herein incorporated in its entirety by reference for all purposes.

BACKGROUND

In an enterprise setting, an enterprise can utilize a management service capable of protecting device data, as well as email, corporate documents, and other enterprise data from theft, data loss, and unauthorized access. Operating system providers can cease support for a particular operating system version, and can provide updated operating system versions that correct security flaws or vulnerabilities. In order to ensure the security and reliability of devices, enterprises can update their devices with newer versions of operating systems.

However, providing timely and effective operating system updates can be costly in time and effort in an enterprise environment that includes multiple devices. Each device can include its own hardware configuration and software configuration. Operating system compatibility issues that arise from these factors can result in productivity loss or update delays. One potential solution can be to have an administrator or an information technology professional manually consider device compatibility issues that are manually reported by users. However, it can be difficult to manually assess the cause of a compatibility issue when considering each device individually, and this solution can overload administrators and information technology professionals in an enterprise environment with many devices. Accordingly, traditional methods can be ineffective for managing operating system updates.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to operating system update management. A client device can include a hardware configuration and a software configuration that can result in operating system compatibility issues. It can be difficult to manually assess the cause of a compatibility issue when considering each client device individually. Accordingly, traditional methods can be ineffective for managing operating system updates. However, the present disclosure provides a more efficient and effective solution for managing operating system updates.

Operating systems builds, security patches, or other updates can be regularly developed and released by an operating system developer or provider. For example, MICROSOFT® can provide patches to update WINDOWS® 10 or another MICROSOFT® operating system for security and other purposes. In some cases, older versions of an operating system are no longer supported by the operating system provider beyond a certain date. Enterprises can desire to update client devices to a new version of an operating system before the installed version is no longer supported. The present disclosure facilitates update management for operating systems including those developed by MICROSOFT®, APPLE®, ANDROID®, and other providers.

As described in further detail below, an OS update schedule can be generated for a number of client devices. The OS update schedule can specify an OS update for the client devices. In order to deploy the OS update to the client devices, a management service can transmit, to a first subset of the client devices, a command to deploy the OS update. Update behavior data, or behavior data that is associated with the OS update, can be received from the first subset of the client devices. The management service can perform an analysis of the update behavior data that correlates an update incompatibility with the OS update and prevent the OS update from being deployed to a second subset of the client devices specified by the OS update schedule.

The analysis can identify the update incompatibility based on factors including a threshold input/output operations per second (TOPS), a threshold TOPS latency, a threshold number of application crashes, a threshold number of unexpected operating system reboots, and a threshold number of operating system crashes. The analysis can correlate the update incompatibility with a particular driver that is incompatible with the OS update. The analysis can also correlate the update incompatibility with a particular application that is incompatible with the OS update.

In some examples, the management service can identify a compatible version of the particular application. A command to install the compatible version of the particular application can be transmitted to a client device. The OS update can be deployed to the client device once the update incompatibility is resolved. The management service can determine that a number of actual deployments of the OS update is behind a predetermined number of deployments indicated in the OS update schedule.

Figure 1:
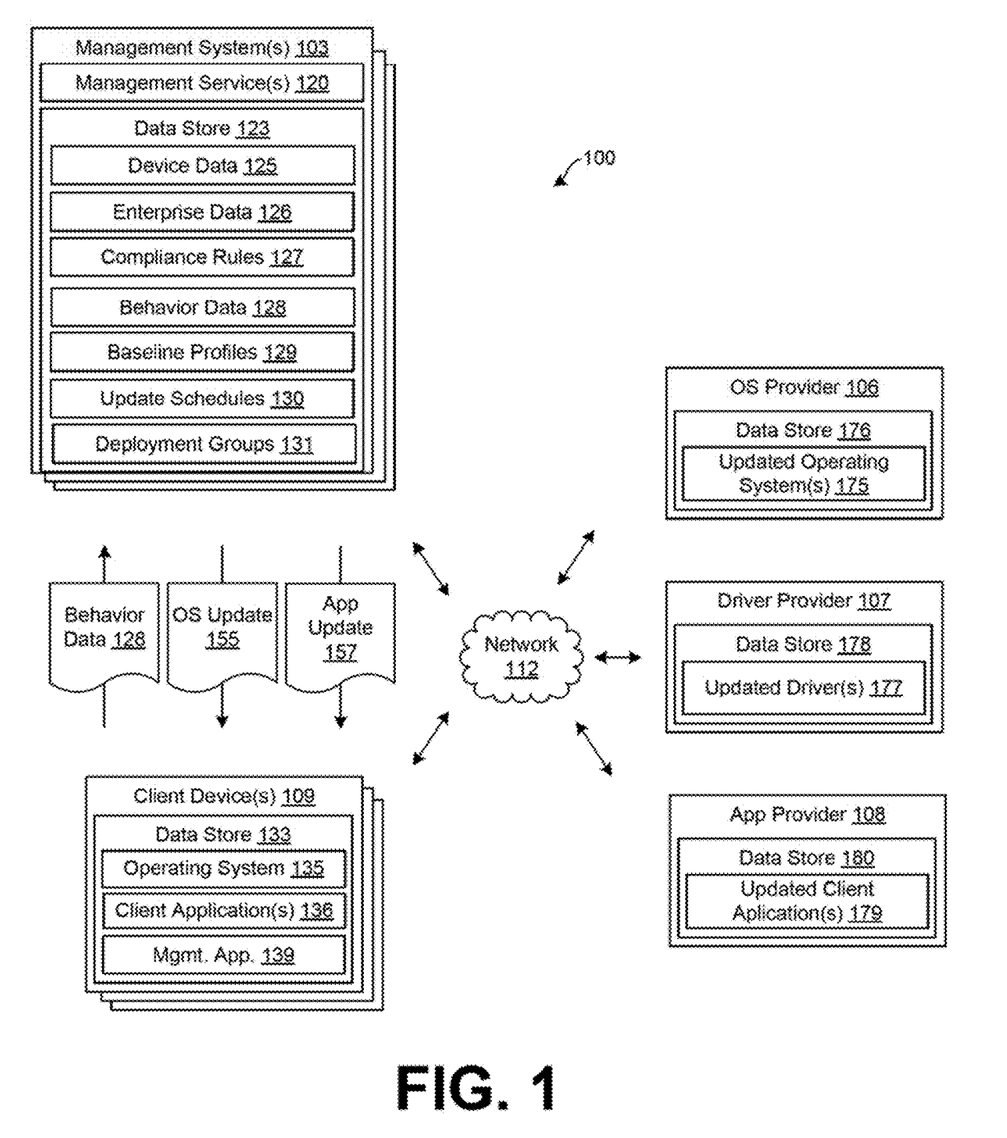
FIG. 1 is a drawing of an example of a networked environment, including a management system, client devices, and other components in communication through a network.

With reference to FIG. 1, shown is an example of a networked environment 100. The networked environment 100 can include management system(s) 103, client device(s) 109, an operating system (OS) provider 106, an application provider 108, and other devices in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network and can be local to at least one of the other components of the networked environment. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 120 as well as other applications, services, processes, systems, engines, or functionality not discussed in detail herein. The management service 120 can be stored in the data store 123 of the management system 103.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 103, mass storage resources of the management system 103, or any other storage resources on which data can be stored by the management system 103. The data stored in the data store 123 can include, for example, management data including device data 125, enterprise data 126, compliance rules 127, behavior data 128, baseline profiles 129, and update schedules 130.

The data stored in the data store 123 can be associated with the operation of the various applications and/or functional entities described. Client devices 109 can be identified within the device data 125 by one or more of a device identifier, a unique device identifier (UDID), a media access control (MAC) address, an internet protocol (IP) address, or another identifier that uniquely identifies a device with respect to other devices. The device data 125 can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for hardware device and peripheral of the client device 109, an operating system or operating system version installed on the client device 109, and other information. The device data 125 can also include an organizational group associated with the client device 109, or an organizational group of a user account associated with the client device 109.

Device data 125 can include data associated with a configuration of each client device 109 and can include an identifier of the client device 109. The identifier can be a serial number, media access control (MAC) address, other network address, or another device identifier. The device data 125 can include an enrollment status indicating whether each client device 109 is enrolled with or managed by the management service 120. A client device 109 designated as "enrolled" can be permitted to access the enterprise data 126, while a client device 109 designated as "not enrolled," or having no designation, can be denied access to the enterprise data 126.

Additionally, device data 125 can include indications of the state of the client devices 109. For instance, these indications can specify applications that are installed on the client devices 109; configurations or settings that are applied to each of the devices, user accounts, or service accounts associated with each of the devices; the physical locations of each of the devices; the local area network and wide area network to which each of the devices is connected; and other information describing the current state of each of the devices.

Device data 125 can also include data pertaining to an organizational groups. An administrator can specify one or more of the client devices 109 as belonging to an organizational group, for example, based on a client device identifier. A user account with the management service 120 can also be registered or indicated as belonging to the organizational group. Organizational groups can be created by an administrator of the management service 120 such that a batch of client devices 109 can be configured according to common settings or common compliance requirements. For instance, an enterprise can create an organizational group for the marketing department and another group for the sales department, where client devices 109 in the marketing department are configured differently from the client devices 109 in the sales department. Additionally or alternatively, compliance rules 127 for client devices 109 in the marketing department can differ from compliance rules 127 for the client devices 109 in the sales department. Organizational groups can include defined deployment rings or deployment groups 131. A deployment group 131 can be an organizational group of devices that that are scheduled for deployment of an operating system update 155 according to an update schedule 130.

Compliance rules 127 can include, for example, configurable criteria that must be satisfied for an enrolled one of the client devices 109 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules 127 can also be determined based on a user account associated with a user.

Compliance rules 127 can include predefined constraints that must be met in order for the management service 120, or other applications, to permit access to the enterprise data 126 or features of the client device 109. The management service 120 can communicate with management application 139 to determine whether states exist on the client device 109 that do not satisfy one or more compliance rules 127. States can include, for example, a virus or malware being detected on the device, violation of a baseline or verified behavior profile, installation or execution of a blacklisted application, and a device being "rooted" or "jailbroken," where root access is provided to a user of the device. Additional states can include the presence of particular files, questionable device configurations, vulnerable versions of applications, vulnerable states of client devices 109 including violation of a baseline or verified profile 129, or other vulnerability, as can be appreciated. Compliance rules 127 can also include rules that define whether a particular client device 109 is in a state that is permitted or prevented from receiving an operating system update 155, based on its states and other device data 125.

Behavior data 128 can be received from the client devices 109. The behavior data 128 can identify behaviors of the client device 109 including memory usage, processor usage, application crashes, operating system crashes, unexpected operating system reboots, network usage according to inputs/outputs (I/Os), inputs/outputs per second (IOPS), megabytes per second, or another data transfer rate, I/O latency, and other information. The behavior data 128 can be received as a tuple or another data structure that identifies the device behaviors. Device data 125 can be included to identify the client device 109 and device data 125 associated with the behavior data 128. The behavior data 128 can be transmitted along with a client device identifier, and the management service 120 can identify additional device data 125 for the client device 109 from the data store 123 based on the client device identifier. The behavior data 128 can also be transmitted along with a more extensive list of device data 125 that includes an operating system version, application version, driver version, and any of the device data 125 described. The management service 120 can store and analyze the behavior data 128 for compatibility issues according to the device data 125.

The management service 120 can oversee the management of the client devices 109. The management service 120 can oversee operating system updates 155 for the client devices 109. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein. The management service 120 can generate and provide an administrative console or user interface for management of the client devices 109. The user interface of the management service 120 can be accessed through client management application 139 or another application of a client device 109, or can be accessed through a network site provided by the management service 120. The management service 120 can provide a user interface for setting and viewing alerts and notifications for anomalies in behaviors of the client devices 109, which can indicate update incompatibilities associated with a particular operating system update 155. The alerts and notifications can also be sent to an email address or to a client device 109.

The management service 120 can receive the behavior data 128 from the client device 109. The operating system 135, a client application 136, or the management application 139 can transmit the behavior data 128 to the management service 120. The management service 120 can provide an API that the client device 109 can invoke to provide the behavior data 128, or a network address or interface through which the behavior data 128 can be submitted. The management service 120 can collect and learn the behaviors from the client device 109 over a threshold period of time or a particular period of time.

The management service 120 generate a baseline profile 129 for each client device 109. A baseline profile 129 can also be generated for a group of the client devices 109 based on organizational groups or device type. The baseline profile 129 can include all of the behaviors of the client device 109 from the behavior data 128, or a subset of the behaviors that are verified to be normal or acceptable. The management service 120 can generate a user interface that describes behaviors from the behavior data 128, which can be rendered on a display of the management system 103 or a client device 109. An administrator or other user can verify or accept all or a subset of the behaviors. The management service 120 can generate a baseline profile 129 based on the behavior data 128 that is verified. For example, the baseline profile 129 for a client device 109 or group of devices can specify baseline values including baseline memory usage, baseline processor usage, baseline number of application crashes, baseline number of operating system crashes, baseline number of unexpected operating system reboots, baseline network usage in I/Os, TOPS, megabytes per second, or another baseline data transfer value, baseline TOPS or another baseline data transfer rate, baseline I/O latency, and other baseline information. Data transfer rate can be calculated based on a particular period of time, for example, total data transferred per second, minute, ten minute period, hour, day, month, or any period of time. In some cases, the baseline profile 129 can be generated based on a history of the behaviors for a particular version or all previous versions of an operating system, or a history of behaviors prior to a particular date.

The management service 120 can also generate an update schedule 130. The update schedule 130 can be generated based on a total number of client devices 109 to update, an updated operating system 175 release date, and an end of developer or provider support for a current operating system 135. The update schedule 130 can include a number of deployment groups 131. The update schedule 130 can include an order of deployment of an operating system update 155 to each deployment group 131 and a specified starting time, ending time, and duration for deployment of the operating system update 155 to each deployment group 131. The update schedule 130 can schedule, for a particular set of client devices 109, deployment or installation of a particular updated operating system 175, which can be a particular updated version of the operating system 135. The management service 120 can provide the client device 109 with the operating system update 155 by providing a network address of the operating system provider. The management service 120 can also download the operating system update 155 and provide the client device 109 with a network address of the management system 103.

The management service 120 can monitor updated behavior data 128 associated with the updated client devices 109 that have installed the updated operating system 175. For example, the management service 120 can continuously monitor all client devices 109, and can identify behaviors associated with the updated operating system 175. This updated behavior data 128 can be analyzed or compared based on baseline profiles 129 to identify an update incompatibility. An update incompatibility can be behavior of an updated client device 109 that differs by a threshold percentage or a threshold value from a baseline value for the client device 109 or a group that includes the client device 109. As discussed in further detail below, the management service 120 can also perform remedial actions to automatically resolve an incompatibility or provide a user interface that directs administrators and information technology professionals to resolve an incompatibility. In this way, the management service 120 can provide automatic solutions and user interfaces to efficiently achieve a target number of operating system updates in a particular period of time, or before a specified date.

The management service 120 can also request that the client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the client device 109 check-in with the management service 120. The notification service can push or otherwise route a notification to the client device 109. Once the notification is received, the management application 139 can cause the client device 109 to check-in with the management service 120, and can retrieve commands or resources from a command queue provided by the management service 120 for the respective client device 109. The management application 139 can cause the commands or resources to be downloaded and/or implemented on the client device 109. The management service 120 can utilize the command queue to transmit commands to the client device 109. For example, the management service 120 can place commands, as discussed herein, into the command queue maintained for the client device 109. Once the client device 109 checks in, based on a schedule, a push notification, or another impetus, the command can be transmitted to the client device 109.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system 135 can be stored in a data store 145 that also includes applications 136, a client management application 139, and other data. The client device 109 can execute the client management application 139 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system 135 of the client device 109 can be configured to execute various applications 136, such as a client management application 139, a browser application, or another application. The operating system 135 and some applications 136 can access network content served up by the management system 103, or other servers, thereby rendering a user interface on a display, such as a liquid crystal display (LCD), organic light emitting diode (OLED) display, touch-screen display, or other type of display device. The operating system 135 can be periodically receive an operating system update 155, for example, according to an update schedule 130.

Some applications 136 can include a browser or a dedicated application, and a user interface can include a network page, an application screen, or other interface. The client device 109 can also access web applications using the browser application. Further, other applications 136 can include device management applications, enterprise applications, social networking applications, word processors, spreadsheet applications, media player applications, or other applications. The client management application 139 can be an application that performs certain functions in concert with the management service 120. The client management application 139 can perform actions as directed by the management service 120, for instance, by checking in with the management service 120, retrieving a command from the command queue, and implementing the command as discussed above.

The operating system provider 106 can be a developer, manufacturer, store, or other provider of the updated operating system 175. The updated operating system 175 can be an updated version of the operating system 135. The updated operating system 175 can include the operating system update 155. The operating system update 155 can update the operating system 135 to the updated operating system 175. The updated operating system 175 can be stored in the data store 173. The operating system provider 106 can provide operating system update data that identifies an availability date for the updated operating system 175 and a URL, URI, or other network address through which the updated operating system 175, or the operating system update 155, can be downloaded. The operating system provider 106 can also provide operating system expiration data that identifies an end of support for the operating system 135 or a particular version of the operating system 135 and updated operating system 175. The operating system provider 106 can also provide operating system compatibility data associated with the updated operating system 175, identifying compatible and incompatible drivers, applications, and devices. The operating system provider 106 can provide a network service to provide the update data, expiration data, and compatibility data. The management service 120 can transmit a request for the operating system update data, expiration data, and compatibility data for a particular operating system such as the operating system 135 or updated operating system 175.

The driver provider 107 can be a developer, manufacturer, store, or other provider of the updated driver 177. The updated driver 177 can be an updated version of a driver installed on the client device 109. The updated driver 177 can be stored in the data store 180. The driver provider 107 can provide application update data that identifies availability of the updated driver 177, as well as a URL, URI, or other network address through which the updated driver 177 can be downloaded. The driver provider 107 can provide a network service to provide the driver update data. The management service 120 can transmit, to the driver provider 107, a request for the driver update data for a particular driver.

The application provider 108 can be a developer, manufacturer, store, or other provider of the updated client application 179. The updated client application 179 can be an updated version of a client application 136. The updated client application 178 can be stored in the data store 180. The application provider 108 can provide application update data that identifies availability of the updated client application 178, as well as a URL, URI, or other network address through which the updated client application 178 can be downloaded. The application provider 108 can provide a network service to provide the application update data. The management service 120 can transmit, to the application provider 108, a request for the application update data for a particular client application 136.

Figure 2:
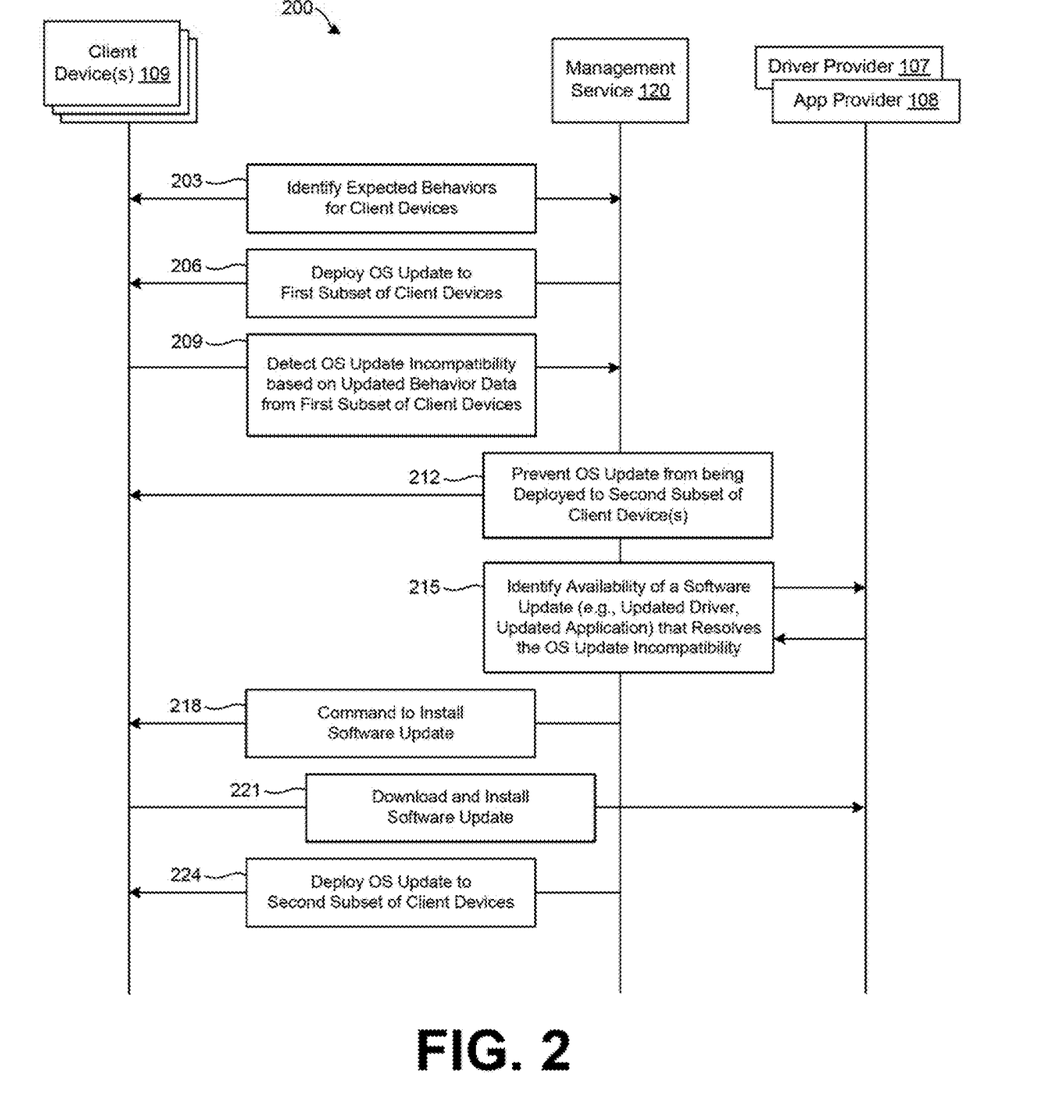
FIG. 2 is an example sequence diagram illustrating functionality implemented by components of the networked environment.

In FIG. 2, shown is an example sequence diagram 200 describing steps that can be performed by the components of the networked environment 100. Generally, the sequence diagram 200 describes how the components identify and resolve operating system update incompatibilities to manage deployment of operating system updates.

In step 203, the management service 120 can identify expected behaviors for client devices 109. The management service 120 can collect and analyze the behaviors received from the client device 109. The client device 109 can transmit the behavior data 128 to the management service 120. The management service 120 can provide an API that the client device 109 can invoke to provide the behavior data 128 or a network address or interface through which the behavior data 128 can be submitted. The client device 109 can include instructions to identify and report behavior data 128 to the management service 120. For example, kernel level tracing instructions can be enabled to identify and write logs of behaviors to a binary on the data store 133. One example of kernel level tracing can include Event Tracing for WINDOWS®. The management application 139 can generate behavior data 128 by collecting and aggregating events identified by kernel level event tracing. The client device 109 can transmit the behavior data 128 to the management service 120.

The management service 120 generate a baseline profile 129 for each client device 109. A baseline profile 129 can also be generated for all client devices 109, or a group of the client devices 109 based on organizational groups or device type. The baseline profile 129 can include all of the behaviors of the client device 109 from the behavior data 128 or a subset of the behaviors that are verified to be normal or acceptable. The baseline profile 129 for a client device 109 or group of devices can specify baseline values including baseline memory usage, baseline processor usage percentage, baseline number of application crashes, baseline number of operating system crashes, baseline number of unexpected operating system reboots, baseline network usage in I/Os, TOPS, megabytes per second, or another baseline data transfer value, baseline TOPS or another baseline data transfer rate, baseline I/O latency, and other baseline information. While the baseline values are sometimes referred to as a number value, the number value can be time correlated and representative of a frequency. For example, a frequency can be calculated as a number value for a client device 109 per day, week, month, year, or any time period. Each of these baseline values can be identified according to client device 109 and client application 136.

In step 206, the management service 120 can deploy an operating system update 155 to a first subset of client devices 109 that are scheduled to receive an operating system update 155. The operating system update 155 can update the operating system 135 to the operating system 175. The update schedule 130 can group client devices 109 according to a number of deployment groups 131. The first subset of client devices 109 can be an entirety of a deployment group 131, or a subset of a deployment group 131. The management service 120 can transmit, to each client device 109 in the first subset of client devices 109, a command to install the operating system update 155. Each of the first subset of client devices 109 can install the operating system update 155. The management application 139 can implement, on a respective client device 109, the command to install the operating system update 155.

In step 209, the management service 120 can monitor updated behavior data 128 associated with the updated client devices 109 that have installed the operating system update 155. This updated behavior data 128 can be analyzed based on baseline profiles 129 to identify an update incompatibility. An update incompatibility can be identified based on updated behavior data 128 of an updated client device 109 differing from a baseline value by a predefined threshold percentage or predefined threshold value. For example, a baseline value for a client device 109 can include a baseline application crashes per day for a particular application. The baseline application crashes per day can be representative of behavior of the client device 109 prior to installation or deployment of an operating system update 155. While baseline values in a baseline profile 129 can also include baseline values that are user-specified, for example, by an administrator or information technology professional.

Once the client device 109 installs the operating system update 155, the management service 120 can monitor its updated behavior data 128 and identify an updated number of application crashes per day. The management service 120 can determine that the updated number of application crashes per day are a threshold value or threshold percentage over the baseline application crashes per day. The management service 120 can thereby identify an update incompatibility indicating that a particular application 136 is incompatible with the operating system update 155. While the discussion above refers to a number of application crashes per day, any of the baseline values discussed can be analyzed as indicated above to identify update incompatibilities. An update incompatibility can be correlated with a particular application, a particular driver, a particular operating system update 155, and other factors.

In step 212, the management service 120 can pause or prevent the operating system update 155 from being deployed to a second subset of client devices 109. To continue the example above, the management service 120 can identify a second subset of client devices 109 that have installed the particular application 136 that is correlated with the update incompatibility. The second subset of client devices 109 can include client devices 109 from the update schedule 130 that include the particular application 136, but have not installed the operating system update 155. The second subset of client devices 109 can be identified from the same deployment group 131 as the first subset of the client devices 109. The management service 120 can also identify a driver incompatibility and identify a second subset of client devices 109 that includes the incompatible driver.

In step 215, the management service 120 can identify availability of a software update that resolves the update incompatibility. The management service 120 can transmit, to the application provider 108, a request for application update data for the particular client application 136. The request can include an identifier of the particular client application 136. The application provider 108 can provide application update data that identifies availability of an updated client application 178, as well as a URL, URI, or other network address through which the updated client application 178 can be downloaded. The management service 120 can also identify a driver incompatibility, request driver update data from the driver provider 107, and obtain the driver update data.

In step 218, the management service 120 can transmit, to each client device 109 in the second subset of client devices 109, a command to install the software update to resolve the incompatibility. A command to install an updated client application 178 can include a URL, URI, or other network address where the updated client application 178 can be obtained. A command to install an updated driver 177 can include a URL, URI, or other network address where the updated driver 177 can be obtained.

In step 221, the client device 109 can download and install the software update to resolve the update incompatibility. For example, the management application 139 can implement the command to install the software update on the client device 109. Once the software update is applied, the management application 139 can transmit, to the management service 120, a confirmation that the software update is installed. In some situations, the management service 120 can generate an update ticket and transmit the update ticket to an information technology professional or administrator. The update ticket can identify an incompatible application or driver and instructions to update the incompatible application or driver. Once the incompatible application or driver is updated, the management application 139 can identify that the updated client application 178 or updated driver 177 is applied and can transmit a confirmation to the management service 120.

In step 224, the management service 120 can deploy the operating system update 155 to the second subset of client devices 109. The management service 120 can transmit, to each client device 109 in the second subset of client devices 109, a command to install the operating system update 155. Each of the first subset of client devices 109 can install the operating system update 155. The management application 139 can implement, on a respective client device 109, the command to install the operating system update 155.

Figure 3:
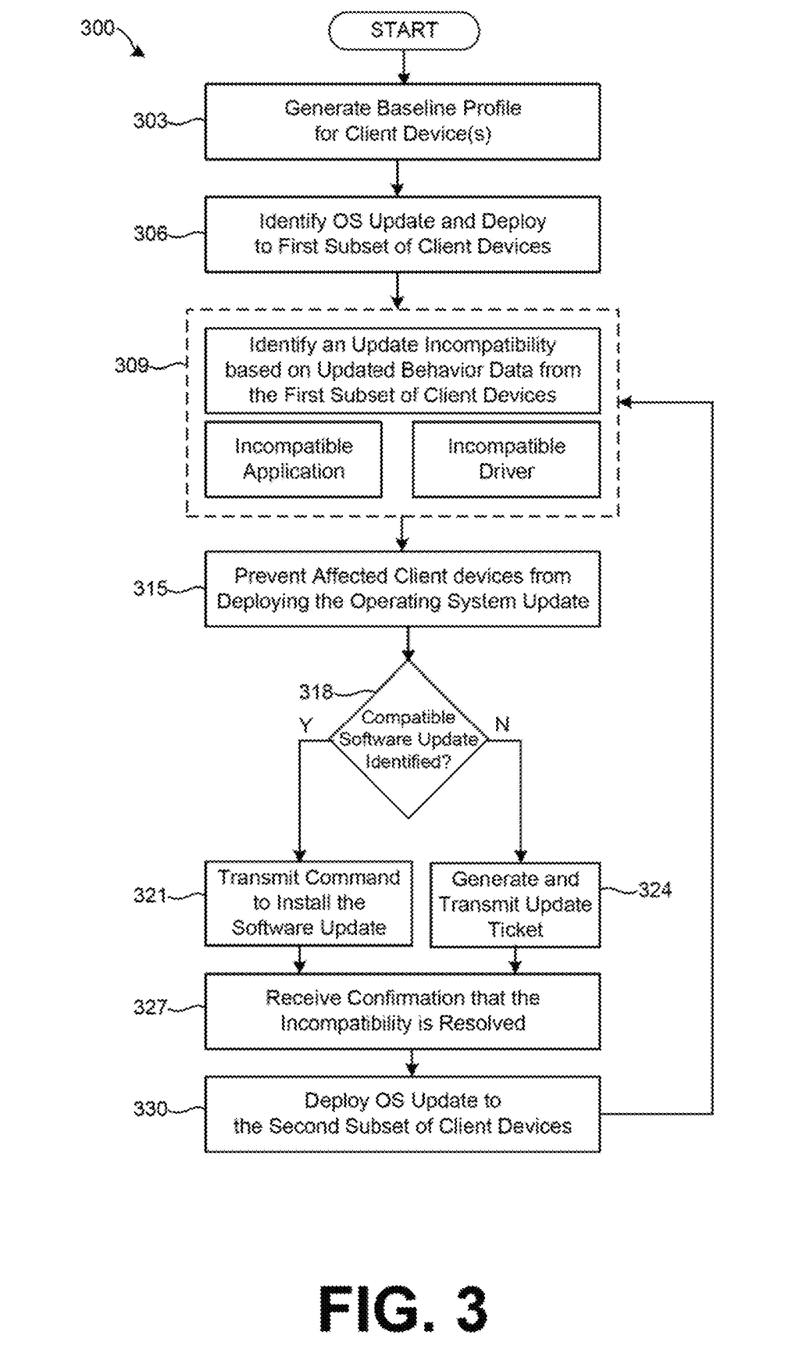
FIG. 3 is an example flowchart illustrating functionality implemented by components of the networked environment.

With reference to FIG. 3, shown is an example flowchart 300 describing steps that can be performed by the management service 120. Generally, the flowchart 300 describes how the management service 120 can manage operating system updates, and more efficiently deploy the updates by identifying and resolving update incompatibilities.

In step 303, the management service 120 can generate a baseline profile 129 for a client device 109 or a per-device profile for a group of client devices 109. The client device 109 can transmit behavior data 128 to the management service 120. The baseline profile 129 can be generated as an average of, a median of, or another calculation based on the behavior data 128 prior to an operating system update 155 or based on a currently installed operating system 135 of the client device 109. The baseline profile 129 for a client device 109 or group of devices can specify baseline values including baseline memory usage, baseline processor usage percentage, baseline application crashes, baseline operating system crashes, baseline unexpected operating system reboots, baseline network usage, baseline I/O latency, and other baseline information. Each of these baseline values can be identified according to client device 109 and client application 136. The baseline profile 129 can define expected behaviors for the client device 109 and its client applications 136.

In step 306, the management service 120 can identify an operating system update 155 and deploy the update to a first subset of client devices 109 according to an update schedule 130. The management service 120 can transmit, to an operating system provider, a request for the operating system update data. In response to the request, the operating system provider 106 can provide operating system update data that identifies an availability date for the updated operating system 175 and a URL, URI, or other network address through which the updated operating system 175 can be downloaded. The operating system provider can also provide expiration data for a current version of the operating system 135 and compatibility data for a particular operating system such as the operating system 135 or updated operating system 175. The management service 120 can generate an update schedule 130 based on the operating system update data and expiration data for the current version of the operating system 135. The management service 120 can transmit, to each client device 109 in the first subset of client devices 109, a command to install the operating system update 155. The management application 139 can implement the command to install the operating system update 155 on each of the first subset of client devices 109.

In step 309, the management service 120 can identify an update incompatibility based on updated behavior data 128 from the first subset of the client devices 109 that have installed the operating system update 155. For example, an updated value from the updated behavior data 128 can differ from a baseline value by a predefined threshold percentage or predefined threshold value. In the case of an incompatible application, the management service 120 can identify that a particular updated value of the updated behavior data 128 correlates with a particular application or a particular driver. For example, the management service 120 can determine a threshold percentage of updated client devices 109 that include the particular application 136 experience an updated values such as an updated memory usage, updated processor usage percentage, updated number of application crashes, updated number of operating system crashes, updated number of unexpected operating system reboots, updated network usage value, updated I/O latency, or other baseline information that differs from a corresponding baseline value by a predefined threshold. Accordingly, the management service 120 can determine that the particular application is incompatible with the operating system update 155. Likewise, the management service 120 can determine that a particular driver is incompatible with the operating system update 155 by identifying that a threshold percentage of updated client devices 109 that include a particular driver experience an updated value that differs from a corresponding baseline value by a predefined threshold.

In step 315, the management service 120 can pause or prevent affected client devices 109 from deploying the operating system update 155. The management service 120 can modify the update schedule 130 to pause the operating system update 155 that is scheduled for a second set of client devices 109 that are affected by the update incompatibility. For example, the second set of client device 109 can be client devices 109 that include an incompatible driver or an incompatible application 136. In some cases, the management service 120 can transmit a command to the client device 109 that causes the management application 139 to pause a previous command to deploy the operating system update 155 to the client device 109.

In step 318, the management service 120 can identify availability of a software update that resolves the update incompatibility. The management service 120 can transmit, to the application provider 108, a request for application update data for the particular client application 136. The request can include an identifier of the particular client application 136. The application provider 108 can provide application update data that identifies availability of an updated client application 178, as well as a URL, URI, or other network address through which the updated client application 178 can be downloaded. The management service 120 can also identify a driver incompatibility, request driver update data from the driver provider 107, and obtain the driver update data. In some cases, no compatible software update is identified, for example, application provider 108 or driver provider 107 does not provide a service that identifies the update data.

In step 321, where a compatible software update is available, the management service 120 can transmit, to each client device 109 in the second subset of client devices 109, a command to install the software update. A command to install an updated client application 178 can include a URL, URI, or other network address where the updated client application 178 can be obtained. A command to install an updated driver 177 can include a URL, URI, or other network address where the updated driver 177 can be obtained. Once the software update is applied, the management application 139 can transmit, to the management service 120, a confirmation that the software update is installed.

In step 324, where a compatible software update is unavailable, the management service 120 can generate an update ticket. The update ticket can identify an incompatible application or driver, and request appropriate action be taken to resolve the incompatibility. The update ticket can be provided through a user interface of the management service 120 or transmitted to a client device 109 associated with an information technology professional or administrator. Once the incompatible application or driver is updated, the management application 139 can identify that the updated client application 178 or updated driver 177 is applied and can transmit a confirmation to the management service 120. In step 324, the client device 109 can download and install the software update to resolve the update incompatibility. For example, the management application 139 can implement the command to install the software update on the client device 109.

In step 327, the management service 120 can receive confirmation that the incompatibility is resolved. For example, the management application 139 can detect that a driver or application 136 has been updated on the client device 109. In some cases, kernel event tracing can indicate that the driver or application 136 has been updated and provide event data to the management application 139. The management application 139 can transmit a confirmation to the management service 120 that the driver or application 136 has been updated. The management service 120 can identify that the updated driver or updated application 136 is a compatible version and confirm that the incompatibility is resolved. The management service 120 can modify the update schedule 130 to permit the operating system update 155 to be installed on the client device 109.

In step 330, the management service 120 can deploy the operating system update 155 to the second subset of client devices 109. The management service 120 can transmit, to each client device 109 in the second subset of client devices 109, a command to install the operating system update 155. Each of the first subset of client devices 109 can install the operating system update 155. The management application 139 can implement, on a respective client device 109, the command to install the operating system update 155.

Figure 4A:
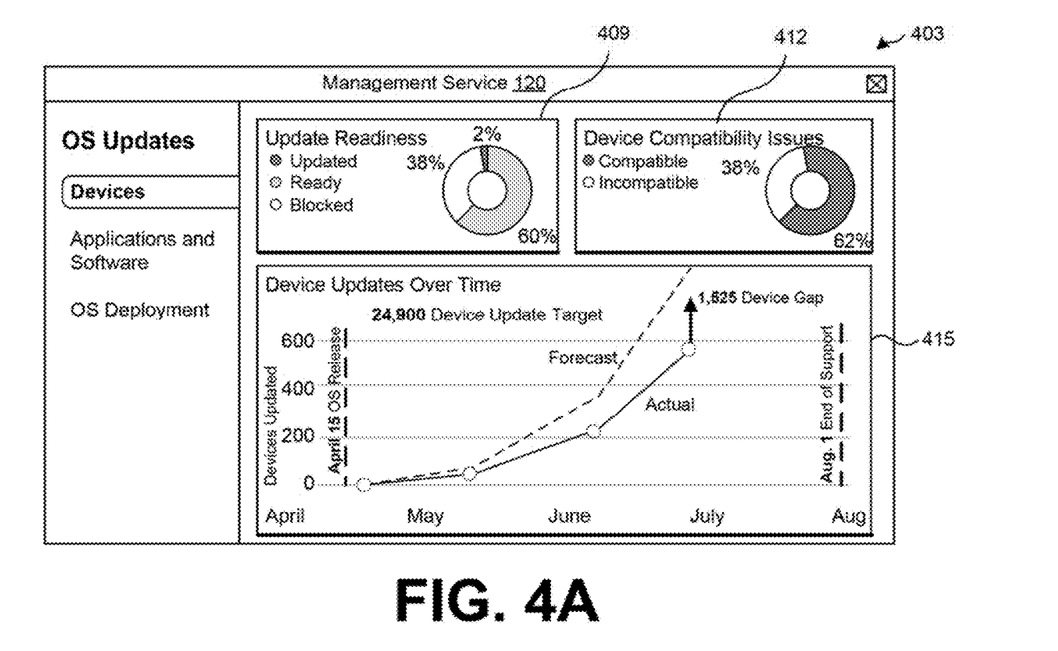
FIGS. 4A-4D are drawings illustrating functionality implemented by components of the networked environment and rendered for display.

FIG. 4A shows an example of a user interface 403 or administrator console generated by the management service 120 and rendered for display. The user interface 403 can include a panel or section 409 that includes an update readiness graph that identifies a percentage of client devices 109 that are updated. The graph can also identify a percentage of client devices 109 that are ready for or compatible with an operating system update 155 but have not yet been updated. The graph can also identify a percentage of client devices 109 that are blocked from an operating system update 155 by an update incompatibility. In some cases, the client devices 109 that are compatible but are not ready can include client devices 109 that are scheduled to deploy an operating system update 155 at a future date. The user interface 403 can also include a panel or section 412 that includes a compatibility graph that identifies a percentage of client devices 109 that are compatible and a percentage of client devices 109 that are incompatible with an operating system update 155. As additional deployment groups and client devices 109 are updated, additional update incompatibilities can be identified. As a result, the update readiness graph, device compatibility graph, and other panels or sections of the user interface 403 can be updated in real time or near real time.

The user interface 403 can also include a panel or section 415 that includes a deployment forecast that graphs an expected number of device updates over time. The deployment forecast can be based on a history of deployments of previous operating system updates 155. The deployment forecast graph can be normalized or based on percentage in order to compare the deployment forecast to the current operating system update 155 deployment. The deployment forecast can be overlaid with a current operating system update 155 deployment. The section 415 can identify a current gap or difference between the operating system update 155 deployment and the forecast. The section 415 can also include a release date of the current operating system update 155 and an end of support for the operating system 135 being updated.

Figure 4B:
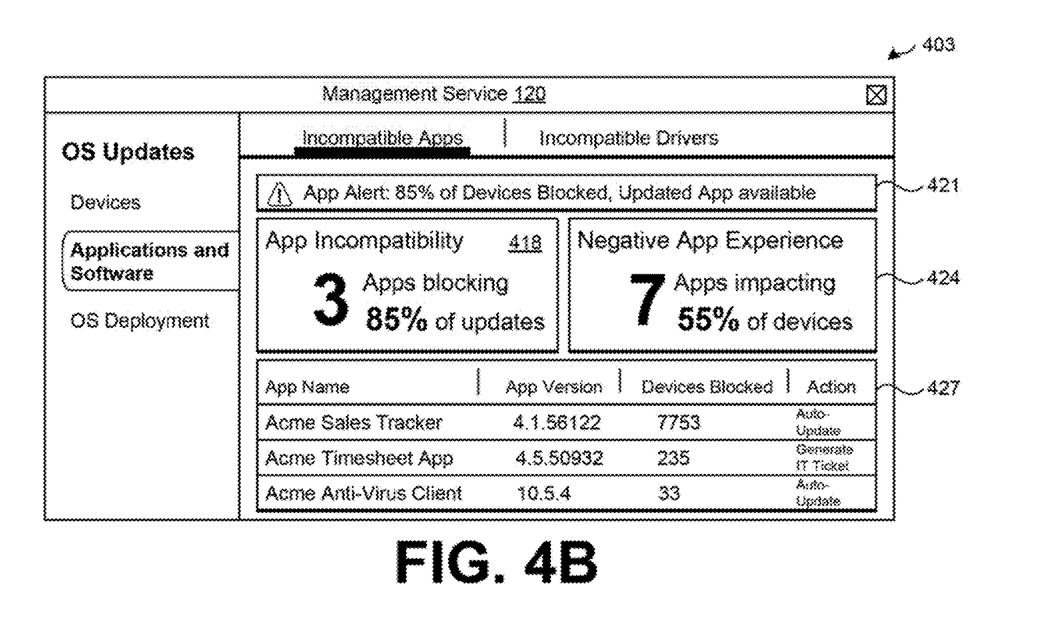

FIG. 4B shows another example of the user interface 403 generated by the management service 120. The user interface 403 can include a panel or section 421 that indicates a percentage of client devices 109 that are blocked or prevented from a scheduled operating system update 155. The section 421 can also indicate whether an updated compatible application is available. The management service 120 can also determine a percentage of the operating system updates 155 prevented by a particular number of applications 136. The management service 120 can generate a panel or section 418 to include the percentage of the operating system updates 155 and the number of applications 136 blocking the operating system updates 155. The management service 120 can also generate a panel or section 424 to show a percentage of client devices 109 impacted negatively by a particular number of applications 136. The management service 120 can also generate a panel or section 427 that includes a table that identifies the incompatible applications identified in section 418. The table can also identify, for each application, an application version number, a number of devices blocked based on the application, and an action. The action can include automatically updating a particular application or generating a ticket.

Figure 4C:
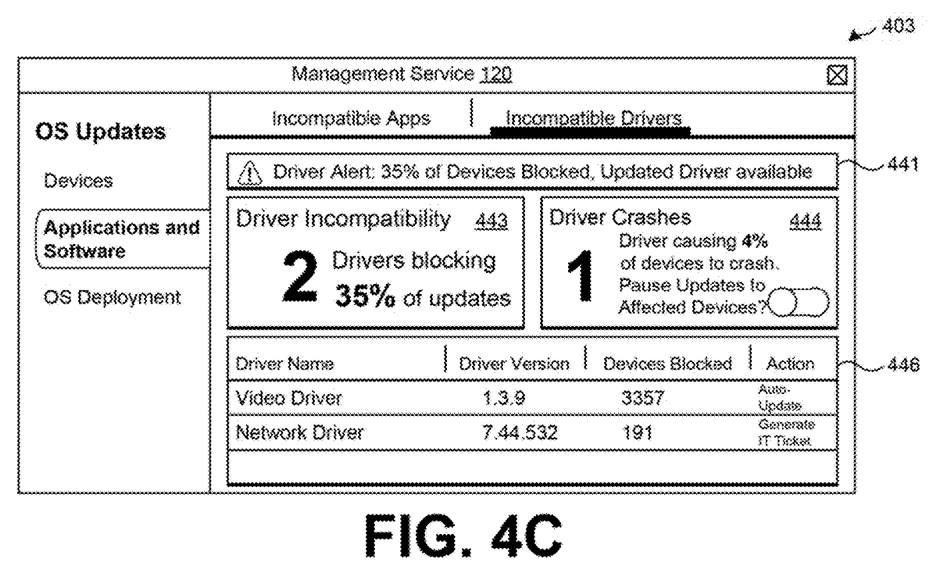

FIG. 4C shows an example of the user interface 403 generated by the management service 120. The user interface 403 can include a panel or section 441 that indicates a percentage of client devices 109 that are blocked or prevented from a scheduled operating system update 155. The section 441 can also indicate whether an updated and compatible driver is available. The management service 120 can also determine a percentage of the operating system updates 155 prevented by a particular number of drivers. The management service 120 can generate a panel or section 443 to include the percentage of the operating system updates 155 and the number of drivers blocking the operating system updates 155. The management service 120 can determine a percentage of client devices 109 that are crashing as a result of a particular driver or set of drivers. A panel or section 444 can include the percentage of client devices 109 that are crashing and a number of drivers causing the crashes. The section 444 can also include a user interface element, that when selected, causes the management service 120 to pause updates for devices affected by an update incompatibility. The management service 120 can also generate a panel or section 446 that includes a table that identifies the incompatible drivers identified in section 443. The table can also identify, for each driver, a driver version number, a number of devices blocked based on the driver, and an action. The action can include automatically updating a particular driver or generating a ticket.

Figure 4D:
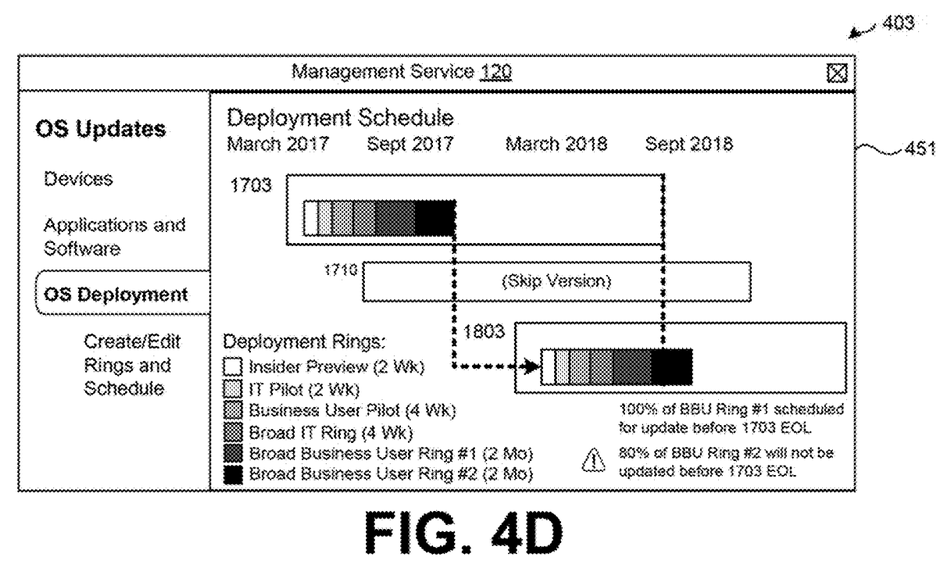

FIG. 4D shows an example of the user interface 403 generated by the management service 120. The user interface 403 can include a panel or section 451 that includes a graphical representation of a deployment or update schedule 130. The section 451 can identify a number of deployment rings or groups, along with a scheduled duration for each of the deployment rings. The management service 120 can include a user interface elements that allows an administrator to create and edit the deployment rings. The management service 120 can provide suggested deployment rings based on user groups and a total number of client devices 109 to be updated.

The panel or section 451 can show life cycle of a particular version of an operating system. For example, an operating system version 1703 is released in March 2017 and is no longer supported in September 2018. The deployment schedule indicates that the client devices 109 that include operating system version 1703 are to skip version 1710 and update directly to operating system version 1803, which is released in March 2018. The section 451 can also include color-coordinated or pattern-coordinated elements that indicate when each of the deployment rings should be upgraded from the operating system version 1703 to the operating system version 1803. The section 451 can also include a percentage of devices in a particular deployment ring that will be updated before a particular operating system version is no longer supported. The section 451 can also include a percentage of devices in a deployment ring that will not be updated before the particular operating system version is no longer supported.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a client application 136, management service 120, or another application can be rendered. In some examples, the user interface can be generated with user interface data provided by the management system 103. The client devices 109 can also include one or more input/output devices that can include, for example, a capacitive touchscreen or other type of touch input device, fingerprint reader, or keyboard.

Although the management service 120, client applications 136, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system, comprising:
   at least one computing device comprising at least one processor; and a memory storing executable instructions, wherein the instructions, when executed by the at least one processor, cause the at least one computing device to at least:
   generate a user interface comprising an operating system (OS) deployment forecast graph of an OS update schedule that specifies an OS update for a plurality of client devices, wherein the OS deployment forecast graph is based on a history of deployments of previous OS updates;
   transmit, to a first subset of the plurality of client devices, a command to deploy the OS update;
   receive, from updated client devices comprising the first subset of the plurality of client devices, update behavior data associated with the OS update;
   perform an analysis of the update behavior data that correlates an update incompatibility with the OS update, the update incompatibility specifying at least one of an application and a driver that is incompatible with the OS update, wherein the at least one of the application and the driver is identified as incompatible based on a threshold percentage of a set of the updated client devices that include the at least one of the application and the driver being correlated with updated behavior values that differ from a baseline behavior value;
   prevent the OS update from being deployed to a second subset of the plurality of client devices specified by the OS update schedule; and
   update the generated user interface to include an actual OS deployment graph, the OS deployment forecast graph, a release date indicator for an updated OS version included in the OS update, and an end-of-support date indicator for an OS version that is updated by the OS update, the actual OS deployment graph comprising an actual number of device updates over time between the release date indicator and the end-of-support date indicator.

2. The system of claim 1, wherein the analysis identifies the update incompatibility based on a threshold number of application crashes.

3. The system of claim 1, wherein the instructions, when executed by the at least one processor, further cause the at least one computing device to at least:
   receive client device identifiers for the first subset of the plurality of client devices, device data specifying the at least one of the application and the driver, wherein the update behavior data for the first subset of the plurality of client devices comprises the client device identifiers; and
   identify the set of the updated client devices that include the at least one of the application and the driver based on the client device identifiers.

4. The system of claim 1, wherein the second subset of the plurality of client devices are selected for prevention of the OS update based on including the at least one of the application and the driver that is incompatible with the OS update.

5. The system of claim 4, wherein the instructions, when executed by the at least one processor, further cause the at least one computing device to at least:
   identify a compatible version of the application;
   transmit, to a client device, a command to install the compatible version of the application; and
   deploy the OS update to the client device once the update incompatibility is resolved.

6. The system of claim 1, wherein the instructions, when executed by the at least one processor, further cause the at least one computing device to at least:
   determine that a number of deployments of the OS update is behind a predetermined number of deployments indicated in the OS update schedule.

7. The system of claim 1, wherein the instructions, when executed by the at least one processor, further cause the at least one computing device to at least:
   generate a user interface comprising: an indication that the OS update is prevented from being deployed to the second subset of the plurality of client devices, and an indication of at least one of: an availability of an updated application that resolves the update incompatibility, or an availability of an updated driver that resolves the update incompatibility.

8. A non-transitory computer-readable medium storing executable instructions, wherein the instructions, when executed by at least one processor, cause at least one computing device to at least:
   generate a user interface comprising an operating system (OS) deployment forecast graph of an OS update schedule that specifies an OS update for a plurality of client devices, wherein the OS deployment forecast graph is based on a history of deployments of previous OS updates;
   transmit, to a first subset of the plurality of client devices, a command to deploy the OS update;
   receive, from updated client devices comprising the first subset of the plurality of client devices, update behavior data associated with the OS update;
   perform an analysis of the update behavior data that correlates an update incompatibility with the OS update, the update incompatibility specifying at least one of an application and a driver that is incompatible with the OS update, wherein the at least one of the application and the driver is identified as incompatible based on a threshold percentage of a set of the updated client devices that include the at least one of the application and the driver being correlated with updated behavior values that differ from a baseline behavior value;

prevent the OS update from being deployed to a second subset of the plurality of client devices specified by the OS update schedule; and update the generated user interface to include an actual OS deployment graph the OS deployment forecast graph, a release date indicator for an updated OS version included in the OS update, and an end-of-support date indicator for an OS version that is updated by the OS update, the actual OS deployment graph comprising an actual number of device updates over time between the release date indicator and the end-of-support date indicator.

9. The non-transitory computer-readable medium of claim 8, wherein the analysis identifies the update incompatibility based on a threshold number of unexpected operating system reboots.

10. The non-transitory computer-readable medium of claim 8, wherein the instructions, when executed by the at least one processor, further cause the at least one computing device to at least:

receive client device identifiers for the first subset of the plurality of client devices, device data specifying the at least one of the application and the driver, wherein the update behavior data for the first subset of the plurality of client devices comprises the client device identifiers; and identify the set of the updated client devices that include the at least one of the application and the driver based on the client device identifiers.

11. The non-transitory computer-readable medium of claim 8, wherein the second subset of the plurality of client devices are selected for prevention of the OS update based on including the at least one of the application and the driver that is incompatible with the OS update.

12. The non-transitory computer-readable medium of claim 11, wherein the instructions, when executed by the at least one processor, further cause the at least one computing device to at least:

identify a compatible version of the application;

transmit, to a client device, a command to install the compatible version of the application; and deploy the OS update to the client device once the update incompatibility is resolved.

13. The non-transitory computer-readable medium of claim 8, wherein the instructions, when executed by the at least one processor, further cause the at least one computing device to at least:

determine that a number of deployments of the OS update is behind a predetermined number of deployments indicated in the OS update schedule.

14. The non-transitory computer-readable medium of claim 8, wherein the instructions, when executed by the at least one processor, further cause the at least one computing device to at least:

generate a user interface comprising: an indication that the OS update is prevented from being deployed to the second subset of the plurality of client devices, and an indication of at least one of: an availability of an updated application that resolves the update incompatibility, or an availability of an updated driver that resolves the update incompatibility.

15. A computer-implemented method, comprising:

generating a user interface comprising an operating system (OS) deployment forecast graph of an OS update schedule that specifies an OS update for a plurality of client devices, wherein the OS deployment forecast graph is based on a history of deployments of previous OS updates;

transmitting, to a first subset of the plurality of client devices, a command to deploy the OS update;

receiving; from updated client devices comprising the first subset of the plurality of client devices, update behavior data associated with the OS update;

performing an analysis of the update behavior data that correlates an update incompatibility with the OS update, the update incompatibility specifying at least one of an application and a driver that is incompatible with the OS update, wherein the at least one of the application and the driver is identified as incompatible based on a threshold percentage of a set of the updated client devices that include the at least one of the application and the driver being correlated with updated behavior values that differ from a baseline behavior value;

preventing the OS update from being deployed to a second subset of the plurality of client devices specified by the OS update schedule; and updating the generated user interface to include an actual OS deployment graph the OS deployment forecast graph, a release date indicator for an updated OS version included in the OS update, and an end-of-support date indicator for an OS version that is updated by the OS update, the actual OS deployment graph comprising an actual number of device updates over time between the release date indicator and the end-of-support date indicator.

16. The computer-implemented method of claim 15, wherein the analysis identifies the update incompatibility based on a threshold number of application crashes.

17. The computer-implemented method of claim 15, further comprising:

receiving client device identifiers for the first subset of the plurality of client devices, device data specifying the at least one of the application and the driver, wherein the update behavior data for the first subset of the plurality of client devices comprises the client device identifiers; and identifying the set of the updated client devices that include the at least one of the application and the driver based on the client device identifiers.

18. The computer-implemented method of claim 15, wherein the second subset of the plurality of client devices are selected for prevention of the OS update based on including the at least one of the application and the driver that is incompatible with the OS update.

19. The computer-implemented method of claim 18, further comprising:

updating the user interface to indicate a number of a plurality of incompatible applications, and a percentage of updates that are blocked by the plurality of incompatible applications.

20. The computer-implemented method of claim 15, wherein the user interface includes a plurality of graphical data points, a respective graphical data point indicative of an actual number of device updates, wherein a most-recent data point of the actual OS deployment graph is shown in association with a numerical deployment gap indicator that shows a number that indicates a difference between the most-recent data point of the actual OS deployment graph and the OS deployment forecast graph, wherein the numerical deployment gap indicator is shown in association with the most-recent data point of the actual OS deployment graph.

\* \* \* \* \*